(12) United States Patent
Wakimoto

(10) Patent No.: US 10,725,562 B2
(45) Date of Patent: Jul. 28, 2020

(54) OPERATION DEVICE, POSITION DETECTION SYSTEM, AND METHOD FOR CONTROLLING OPERATION DEVICE

(71) Applicant: SEIKO EPSON CORPORATION, Tokyo (JP)

(72) Inventor: Shingo Wakimoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/367,678

(22) Filed: Mar. 28, 2019

(65) Prior Publication Data

US 2019/0302907 A1  Oct. 3, 2019

(30) Foreign Application Priority Data

Mar. 29, 2018  (JP) ................... 2018-065181

(51) Int. Cl.
*G06F 3/0354* (2013.01)
*G06F 3/042* (2006.01)
*G06F 3/038* (2013.01)

(52) U.S. Cl.
CPC ........ *G06F 3/03542* (2013.01); *G06F 3/0383* (2013.01); *G06F 3/0425* (2013.01)

(58) Field of Classification Search
CPC .. G06F 3/0304; G06F 3/04883; G06F 3/0308; G06F 3/03542
See application file for complete search history.

(56) References Cited

U.S. PATENT DOCUMENTS

| | | | | |
|---|---|---|---|---|
| 2006/0007185 A1* | 1/2006 | Kobayashi | .......... | G06F 3/03542 345/176 |
| 2011/0279248 A1* | 11/2011 | Ogawa | .................... | G08C 17/02 340/13.25 |
| 2015/0015482 A1* | 1/2015 | Njolstad | ............... | G06F 3/0386 345/156 |
| 2015/0177910 A1 | 6/2015 | Shimura | | |

FOREIGN PATENT DOCUMENTS

| | | |
|---|---|---|
| JP | 2005-165831 A | 6/2005 |
| JP | 2015-121986 A | 7/2015 |

* cited by examiner

*Primary Examiner* — Kevin M Nguyen
(74) *Attorney, Agent, or Firm* — Oliff PLC

(57) ABSTRACT

A pointing element used to operate a screen includes a front end light emitter and a controller that causes the front end light emitter to emit light for signal light transmission, and the controller causes the front end light emitter to emit light in a first light emission mode in a state in which the pointing element is not in contact with the screen and causes the front end light emitter to emit light in a second light emission mode in which the amount of light emitted from the front end light emitter is smaller than in the first light emission mode in a state in which the pointing element is in contact with the screen.

15 Claims, 10 Drawing Sheets

OPERATION DEVICE, POSITION DETECTION SYSTEM, AND METHOD FOR CONTROLLING OPERATION DEVICE

BACKGROUND

1. Technical Field

The present invention relates to an operation device, a position detection system, and a method for controlling the operation device.

2. Related Art

There has been a known operation device used to operate an operation surface (see JP-A-2005-165831, for example).

JP-A-2005-165831 discloses a dedicated light emitting pen (pointing member) including a switch section that evaluates whether or not the front end of the pen has come into contact with a coordinate input surface.

The operation device needs to communicate with another apparatus so that the operation device can cooperate with the other apparatus and therefore consumes a large amount of electric power. There is therefore a demand for reduction in the consumed electric power to prolong the life of the operation device.

SUMMARY

An advantage of some aspects of the invention is to reduce power consumption with a decrease in operation detection accuracy suppressed.

An aspect of the invention is directed to an operation device used to operate an operation surface and including a light emitter and a controller that causes the light emitter to emit light for signal light transmission, and the controller causes the light emitter to emit light in a first light emission mode in a state in which the operation device is not in contact with the operation surface and causes the light emitter to emit light in a second light emission mode in which an amount of light emitted from the light emitter is smaller than in the first light emission mode in a state in which the operation device is in contact with the operation surface.

According to the configuration described above, the controller causes the light emitter to emit light in the second light emission mode, in which the amount of light emitted from the light emitter is smaller than in the first light emission mode, in the state in which the operation device is in contact with the operation surface, whereby the power consumption of the operation device can be reduced with a decrease in operation detection accuracy suppressed.

In the aspect of the invention, the controller may cause the light emitter to periodically emit light in the first or second light emission mode. The first and second light emission modes may each have a plurality of light emission time periods in one period. A light emission time period in the second light emission mode may be shorter than the light emission time period in the first light emission mode.

According to the configuration described above, the light emission time period in the second light emission mode is shorter than the light emission time period in the first light emission mode, whereby the power consumption in the case where the operation device is caused to emit light in the second light emission mode can be reduced.

In the aspect of the invention, the operation device may further include an adjuster that adjusts current supplied to the light emitter, and the controller may control the adjuster in such a way that an amount of current supplied to the light emitter in the second light emission mode is smaller than the amount of current supplied to the light emitter in the first light emission mode.

According to the configuration described above, the amount of current supplied to the light emitter in the second light emission mode is smaller than the amount of current supplied to the light emitter in the first light emission mode, whereby the power consumption in the case where the operation device is caused to emit light in the second light emission mode can be reduced.

In the aspect of the invention, the controller may change the amount of light emitted from the light emitter in the second light emission mode based on optical characteristics of a screen as the operation surface.

According to the configuration described above, the amount of light emitted from the light emitter can be changed to an optimum amount of light based on the optical characteristics of the screen, whereby the power consumption of the operation device can be further reduced.

In the aspect of the invention, the operation device may further include a detector that detects the contact with the operation surface, and the controller may cause the light emitter to emit light in the first light emission mode in a state in which the detector has not detected the contact with the operation surface and cause the light emitter to emit light in the second light emission mode in a state in which the detector has detected the contact with the operation surface.

According to the configuration described above, the light emitter is allowed to emit light in the first or second light emission mode based on whether or not the detector has detected the contact with the operation surface.

Another aspect of the invention is directed to a position detection system including an operation device used to operate an operation surface and a detection apparatus that detects operation performed by using the operation device. The operation device includes a light emitter and a controller that causes the light emitter to emit light for signal light transmission. The controller causes the light emitter to emit light in a first light emission mode in a state in which the operation device is not in contact with the operation surface and causes the light emitter to emit light in a second light emission mode in which an amount of light emitted from the light emitter is smaller than in the first light emission mode in a state in which the operation device is in contact with the operation surface. The detection apparatus includes an optical detector that detects the light emitted from the operation device and a detection controller that detects operation performed by using the operation device on the operation surface based on a state of the detection performed by the optical detector.

According to the configuration described above, the controller causes the light emitter to emit light in the second light emission mode, in which the amount of light emitted from the light emitter is smaller than in the first light emission mode, in the state in which the operation device is in contact with the operation surface, whereby the power consumption of the operation device can be reduced with a decrease in operation detection accuracy suppressed.

Another aspect of the invention is directed to a method for controlling an operation device including a light emitter and used to operate an operation surface, the method including detecting whether or not the operation device is in contact with the operation surface, causing the light emitter to emit light in a first light emission mode in a case where the state in which the operation device is not in contact with the operation surface is detected, and causing the light emitter to emit light in a second light emission mode in which an amount of light emitted from the light emitter is smaller than in the first light emission mode in a case where the state in which the operation device is in contact with the operation surface is detected.

According to the configuration described above, the light emitter is causes to emit light in the second light emission mode, in which the amount of light emitted from the light emitter is smaller than in the first light emission mode, in the state in which the operation device is in contact with the operation surface, whereby the power consumption of the operation device can be reduced with a decrease in operation detection accuracy suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Configuration of Position Detection System

Figure 1:
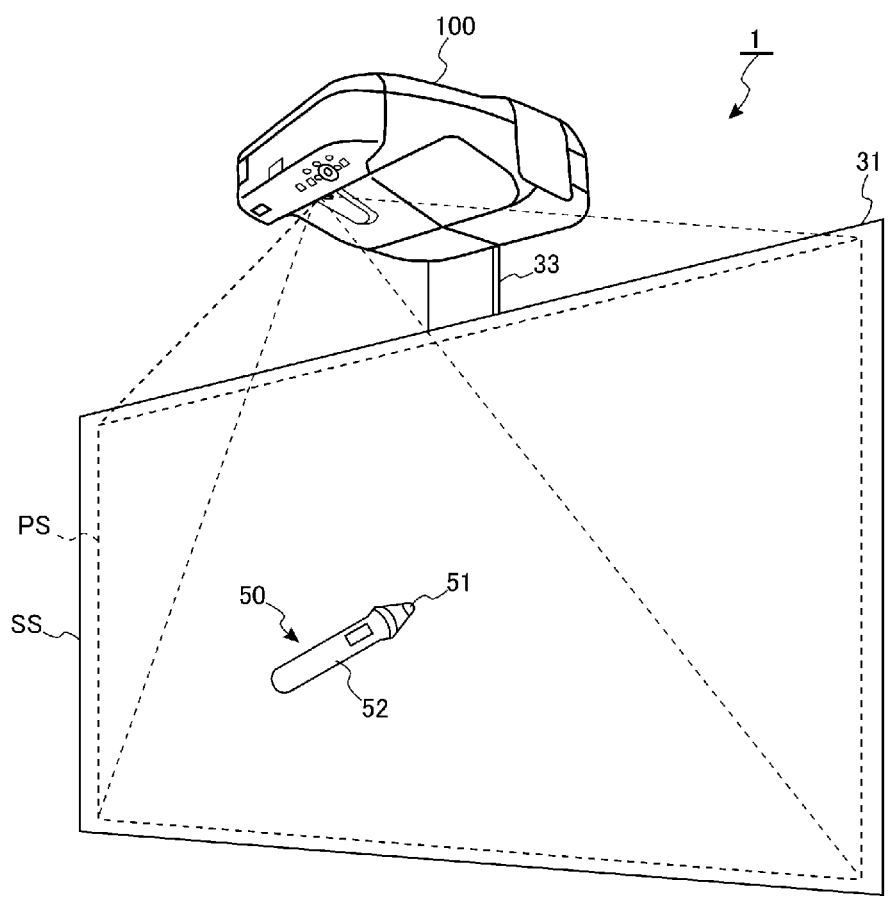
FIG. 1 is a perspective view showing the configuration of a position detection system.

An embodiment of the invention will be described below with reference to the accompanying drawings. FIG. 1 is a perspective view showing the configuration of a position detection system 1. The position detection system 1 according to the present embodiment includes a pointing element 50, which acts as an operation device, and a projector 100, which acts as a detection apparatus.

The pointing element 50 is a pen-shaped, handheld pointing element used by a user and includes a front end section 51, which can emit light, a shaft section 52, which the user grips, and other portions. The front end section 51 incorporates a light source that emits near-infrared light, such as an LED. The pointing element 50 emits the light at predetermined light emission intervals with the front end section 51 being in contact with an operation surface. The pointing element 50 emits the light at the predetermined light emission intervals also with the front end section 51 being not in contact with the operation surface (the state is hereinafter referred to as a hovering state). FIG. 1 shows a single pointing element 50, but the number of pointing elements 50 that can be simultaneously used is not limited to one, and a plurality of pointing elements 50 can be simultaneously used.

The projector 100 is what is called a short-focal-length projector and is fixed via a support member 33 in a position in front of a screen plate 31 and thereabove. A screen SS is formed on the screen plate 31. The screen SS is formed on a front surface of the screen plate 31. The front surface of the screen plate 31 is a surface facing the side on which the projector 100 projects an image. FIG. 1 shows a case where the screen SS is vertically installed, and the screen SS can instead be horizontally installed to allow the projector 100 to project an image on the horizontally installed screen SS. The screen SS may instead be a curtain hung on a wall surface or a surface of a piece of furniture, or a wall surface or a floor surface may be used as the screen SS. In the present embodiment, the screen SS refers to a surface of a member on which an image is projected.

The projector 100 projects image light on the screen SS to display an image (hereinafter referred to as projection image). The projector 100 produces the image light based, for example, on image data stored in a projection image memory 125 (see FIG. 2) of the projector 100 or image data supplied from an image supplying apparatus (not shown) that supplies image data. A projection screen PS is formed on the screen SS. The projection screen PS refers to an area where the projector 100 can project a projection image in a normal state in which the projector 100 is used.

Figure 2:
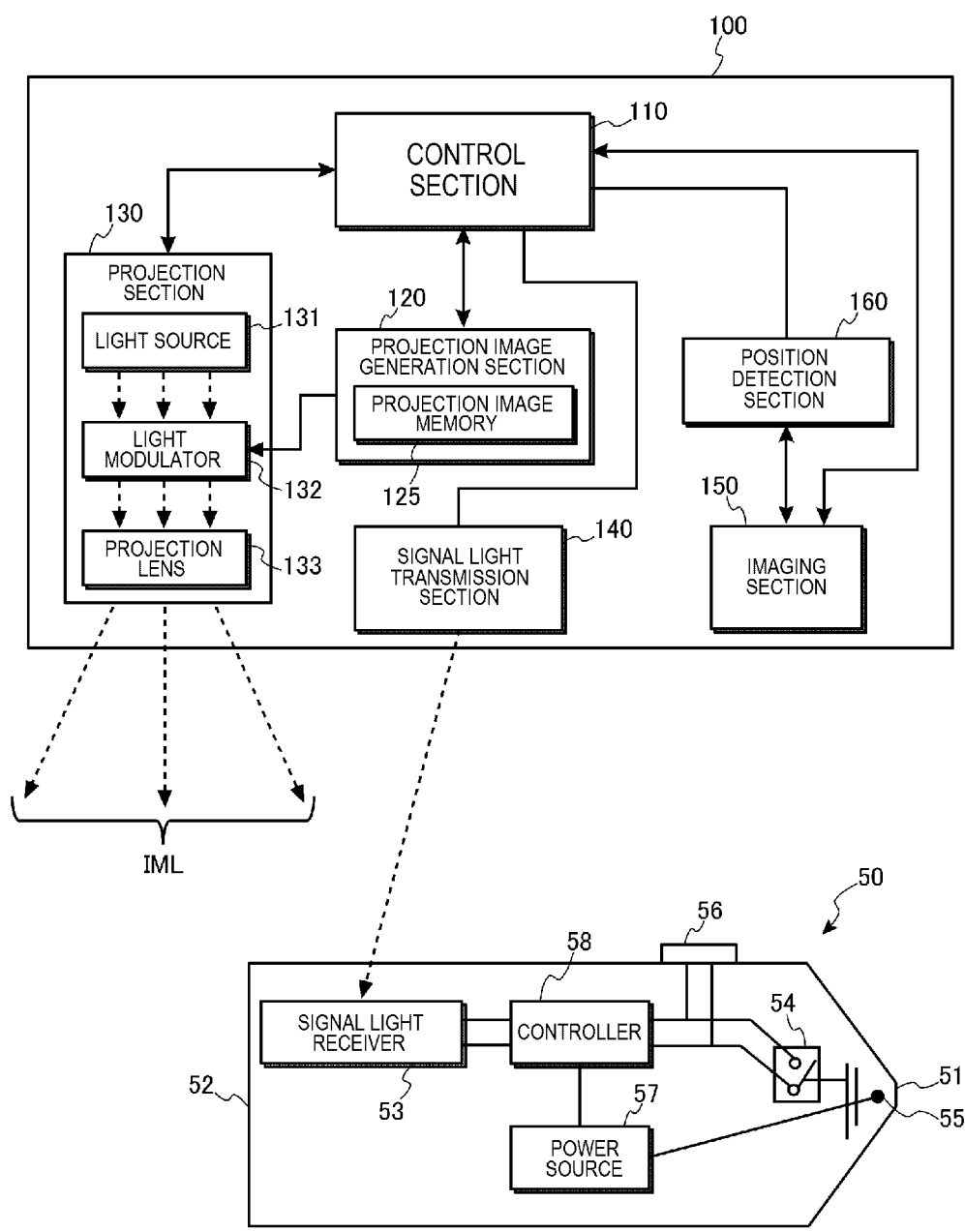
FIG. 2 is a configuration diagram showing the configurations of a projector and a pointing element.

The projector 100 further includes an imaging section 150 (see FIG. 2). The imaging section 150 captures an image of a range including at least the projection screen PS to produce captured image data. In the present embodiment, since the projector 100 is installed in a position obliquely above the screen SS, the imaging section 150 captures an image of the range including the screen SS from a position obliquely above the screen SS. Causing the imaging section 150 to perform the image capture in accordance with the timing at which the pointing element 50 emits light allows the captured image data to contain a captured image of the light emitted from the pointing element 50. The projector 100 analyzes the captured image data to detect the position at which the pointing element 50 points.

Configurations of Projector 100 and Pointing Element 50

FIG. 2 is a configuration diagram showing the configurations of the projector 100 and the pointing element 50. The configuration of the projector 100 will first be described.

The projector 100 includes a control section 110, a projection image generation section 120, a projection section 130, a signal light transmission section 140, the imaging section 150, and a position detection section 160.

The control section 110 includes a processor, such as a CPU, a storage device, such as a memory, and a variety of peripheral circuits. That is, the control section 110 has the function as a computer. The control section 110 causes the processor to execute a program stored in the storage device to control each of the sections of the projector 100. The control section 110 may instead be formed of a plurality of processors or semiconductor chips.

The control section 110 controls each of the sections of the projector 100 to cause them to project a projection image on the screen SS. The control section 110 detects operation performed on the screen SS by using the pointing element 50 based on the result of the detection performed by the position detection section 160, which will be described later. The control section 110 evaluates the content indicated by the operation performed by using the pointing element 50 and controls the projection image generation section 120 based on the result of the evaluation. Specifically, the control section 110 causes the projection image generation section 120 to carry out the process of changing the projection image drawn in the projection image memory 125.

The projection image generation section 120 includes the projection image memory 125, which stores a projection image. The projection image memory 125 is what is called a frame memory, which stores an image to be projected by the projection section 130 on a frame basis.

The projection image generation section 120 draws a projection image to be projected on the screen SS in the projection image memory 125 based on image data. The projection image generation section 120 outputs an image signal representing the image drawn in the projection image memory 125 to a light modulator 132, which will be described later, and causes the projection section 130 to project the image on the projection screen PS.

The projection image generation section 120 performs image processing on the image drawn in the projection image memory 125. For example, the projection image generation section 120 carries out a geometric correction process of correcting trapezoidal distortion and other types of distortion of the projection screen PS, a digital zooming process of enlarging or reducing the projection screen PS, a color correction process of correcting the color tone and other factors of the projection screen PS, and other processes.

The projection section 130 projects the image processed by the projection image generation section 120 on the screen SS. The projection section 130 includes a light source 131, the light modulator 132, and a projection lens 133.

The light source 131 is formed of a xenon lamp, an ultrahigh-pressure mercury lamp, an LED (light emitting diode), a laser light source, or any other light source. The light source 131 may further include a reflector and an auxiliary reflector that guide the light emitted by the light source to the light modulator 132. The light source 131 may further include a lens group for enhancing the optical characteristics of the projection light, a polarizer, a light adjusting element that is disposed in the path leading to the light modulator 132 and attenuates the amount of the light emitted by the light source, or any other component (none of the components described above is shown).

The light modulator 132 modulates the light incident from the light source 131 in accordance with the image signal inputted from the projection image memory 125 to form projection image light IML. The projection image light IML is typically color image light containing RGB three color visible light fluxes.

The projection lens 133 is a lens group that projects the projection image light IML modulated by the light modulator 132 on the screen SS to form an image on the screen SS. The projection lens 133 may further include a zoom mechanism that enlarges or reduces an image projected on the screen SS and a focus adjustment mechanism that adjusts focusing.

The signal light transmission section 140 outputs apparatus signal light ASL, which is a signal for synchronizing the timing at which the pointing element 50 emits light with the timing at which the imaging section 150 performs the image capture. The apparatus signal light ASL is a near-infrared signal receivable by a signal light receiver 53 of the pointing element 50. The signal light receiver 53 will be described later. The signal light transmission section 140 transmits the apparatus signal light ASL on a regular basis during the time period for which the projector 100 is in operation.

The apparatus signal light ASL is a control signal that, for example, specifies the timing at which the pointing element 50 transmits pointing element signal light PSL. The pointing element signal light PSL is near-infrared light having a light emission pattern specified in advance. The pointing element 50 transmits the pointing element signal light PSL in synchronization, for example, with the timing at which the apparatus signal light ASL is received. The projector 100 can therefore cause the imaging section 150 to perform the image capture in accordance with the timing at which the pointing element 50 emits the pointing element signal light PSL. The pointing element signal light PSL corresponds to the "signal light" in an aspect of the invention.

The imaging section 150 acts as the "light detector" in an aspect of the invention and includes an imaging device that receives the near-infrared light emitted from a front end light emitter 55 of the pointing element 50, such as a CMOS device and a CCD, an optical system that forms an image on the imaging device, an aperture that restricts the light incident on the imaging device, and other components (none of them is shown). The imaging section 150 captures an image of the range including the screen SS to produce captured image data. The imaging section 150 receives and captures an image of the pointing element signal light PSL emitted from the pointing element 50. The captured image data produced by the imaging section 150 is outputted to the position detection section 160. The state in which the captured image data contains an image of the pointing element signal light PSL corresponds to the "detected state" in an aspect of the invention. The imaging section 150 can also receive visible light by switching a filter or any other component.

The position detection section 160 acts as the "detection controller" in an aspect of the invention and detects the pointing element signal light PSL from the captured image data produced by the imaging section 150. The position detection section 160 identifies the position at which the pointing element 50 points in the captured image data based on the detected image of the pointing element signal light PSL.

The configuration of the pointing element 50 will next be described.

The pointing element 50 includes the front end section 51, the shaft section 52, the signal light receiver 53, a front end switch 54, the front end light emitter 55, a button switch 56, a power source 57, and a controller 58.

The signal light receiver 53 receives the apparatus signal light ASL transmitted from the projector 100. The signal light receiver 53 outputs a control signal representing the timing at which the apparatus signal light ASL has been received, data produced by decoding the apparatus signal light ASL, and other pieces of information to the controller 58.

The front end switch 54 is a switch that is turned on when the front end section 51 comes into contact with the screen SS and is therefore pushed and turned off when the front end section 51 is separate from the screen SS. The front end switch 54 corresponds to the "detector" in an aspect of the invention.

The front end light emitter 55 includes an LED (light emitting diode) that emits near-infrared light, and the controller 58 controls the light emission state of the front end light emitter 55. The front end light emitter 55 outputs the pointing element signal light PSL which is near-infrared light. The front end light emitter 55 corresponds to the "light emitter" in an aspect of the invention.

The button switch 56 is a switch provided on the shaft section 52 of the pointing element 50 and has the same function as that of the front end switch 54. That is, the user may turn on the button switch 56 instead of turning on the front end switch 54. The button switch 56 may have a function different from the function of the front end switch 54.

The power source 57 includes a battery, such as a primary battery, a secondary battery, or a photovoltaic battery, and supplies each of the sections of the pointing element 50 with electric power. The pointing element 50 may include a power switch that starts and stops the power supply from the power source 57.

The controller 58 includes a processor, such as a CPU (central processing unit), a storage device, such as a memory, and a variety of peripheral circuits. That is, the controller 58 has the function as a computer. The controller 58 causes the processor to execute a program stored in the storage device to control each of the sections of the pointing element 50. The controller 58 may instead be formed of a plurality of processors or semiconductor chips.

The controller 58 determines a light emission timing at which the front end light emitter 55 emits light based on the control signal inputted from the signal light receiver 53. The controller 58 causes the front end light emitter 55 to emit light at the determined light emission timing to output the pointing element signal light PSL.

Figure 3:
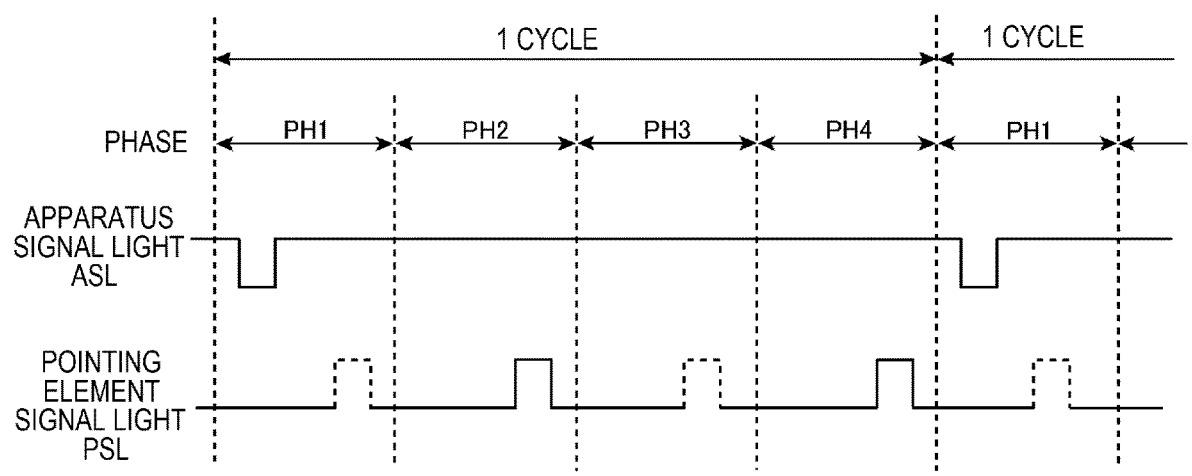
FIG. 3 shows a light emission sequence in accordance with which the projector and the pointing element emit light in a first light emission mode.

FIG. 3 is a timing chart showing the light emission timings at which the apparatus signal light ASL and the pointing element signal light PSL are emitted.

A method for synchronizing the light emission timing at which the pointing element 50 emits light with the image capture timing at which the imaging section 150 performs the image capture will be described with reference to the light emission timings shown in FIG. 3 at which the apparatus signal light ASL and the pointing element signal light PSL are emitted.

The projector 100 repeats a first phase PH1, a second phase PH2, a third phase PH3, and a fourth phase PH4 in the presented order. The projector 100 repeats the four phases as one period (cycle) to identify the position of the pointing element 50 and detect operation performed by using the pointing element 50. The first phase PH1, the second phase PH2, the third phase PH3, and the fourth phase PH4 each correspond to the "light emission time period" in an aspect of the invention. In the first phase PH1, the second phase PH2, the third phase PH3, and the fourth phase PH4, the time period for which the front end light emitter 55 of the pointing element 50 emits light to transmit the pointing element signal light PSL corresponds to the "light emission time period" in an aspect of the invention.

The first phase PH1 is a synchronization phase. In the first phase PH1, the projector 100 transmits the apparatus signal light ASL, which is a synch signal. The length of each of the first phase PH1 to the fourth phase PH4 is set in advance. Having received the apparatus signal light ASL, the pointing element 50 identifies the timing at which each of the first phase PH1, the second phase PH2, the third phase PH3, and the fourth phase PH4 starts.

When the user presses the button switch 56 of the pointing element 50, the pointing element 50 transmits the pointing element signal light PSL in the first phase PH1. In FIG. 3, the waveform of the pointing element signal light PSL drawn with the broken line in the first phase PH1 represents the waveform of the pointing element signal light PSL transmitted when the button switch 56 is pressed. In the first phase PH1, the timing at which the projector 100 transmits the apparatus signal light ASL does not coincide with the timing at which the pointing element 50 transmits the pointing element signal light PSL.

The second phase PH2 is a position detection phase. In the second phase PH2, the pointing element 50 transmits the pointing element signal light PSL. The projector 100 causes the imaging section 150 to perform the image capture in accordance with the light emission timing at which the pointing element 50 emits light in the second phase PH2 to capture an image of the pointing element signal light PSL. The projector 100 thus detects the position of the pointing element 50.

The third phase PH3 is a pointing element determination phase. In the third phase PH3, the pointing element 50 emits light in a light emission pattern set in advance.

In a case where a plurality of pointing elements 50 are used to operate the projector 100, the pointing elements emit light in different light emission patterns. A description will be made, for example, of a case where two pointing elements 50, pointing elements 50A and 50B (neither of them is shown), are used to operate the projector 100. It is assumed that the pointing element 50A emits light in a light emission pattern set at "100," and that the pointing element 50B emits light in a light emission pattern set at "010." Consider three consecutive cycles, and the pointing elements 50A and 50B each causes the front end light emitter 55 to emit light in the third phase PH3 in the cycle corresponding to "1" and causes the front end light emitter 55 to emit no light in the third phase PH3 in the cycle corresponding to "0". In the three consecutive cycles, the pointing element 50A, the light emission pattern of which is set at "100," causes the front end light emitter 55 to emit light in the third phase PH3 in the first cycle and causes the front end light emitter 55 to emit no light in the third phase PH3 in the second and third cycles. One cycle is one period formed of one set of the first phase PH1 to the fourth phase PH4. The pointing element 50B, the light emission pattern of which is set at "010," causes the front end light emitter 55 to emit no light in the third phase PH3 in the first cycle, causes the front end light emitter 55 to emit light in the third phase PH3 in the second cycle, and causes the front end light emitter 55 to emit no light in the third phase PH3 in the third cycle. In the three consecutive cycles, the projector 100 detects the light emission states of the pointing elements 50A and 50B in the third phases PH3 to distinguish the pointing elements 50A and 50B from each other.

The third phase PH3 is also a phase in which the projector 100 is notified of whether the front end switch 54 has been turned on. The pointing element 50 changes the light emission pattern in the third phase PH3 in accordance with whether the front end switch 54 has been turned on or off.

Figure 4:
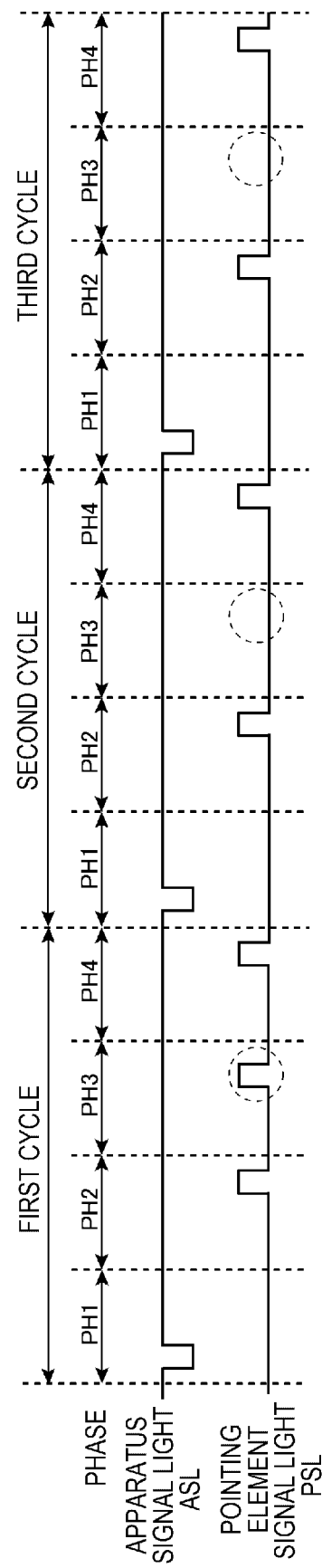
FIG. 4 shows a light emission sequence in accordance with which the pointing element emits light in three consecutive cycles.
Figure 5:
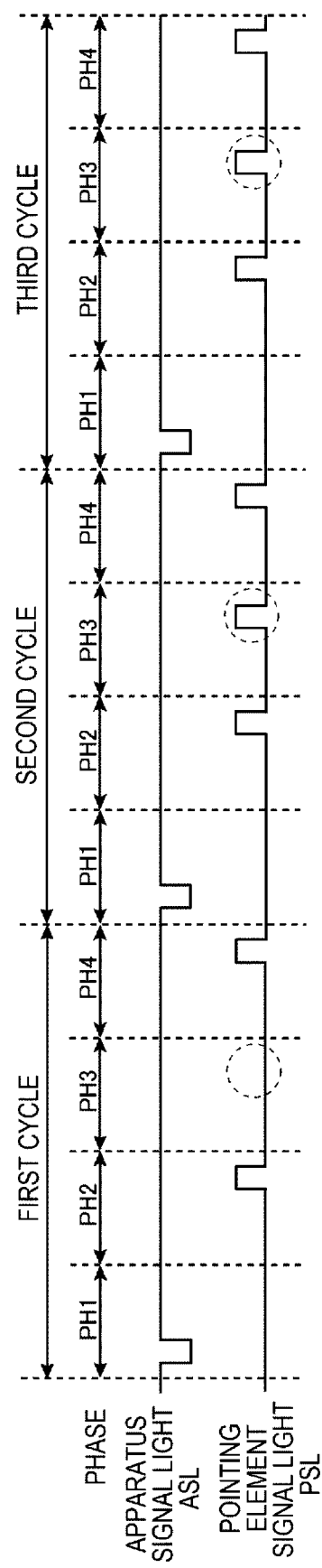
FIG. 5 shows another light emission sequence in accordance with which the pointing element emits light in the three consecutive cycles.

FIGS. 4 and 5 show the light emission patterns in accordance with which the pointing element 50 emits light in three consecutive cycles, a first cycle, a second cycle, and a third cycle. In particular, FIG. 4 shows the light emission pattern in a case where the front end section 51 of the pointing element 50 has come into contact with the screen SS and the front end switch 54 has therefore been turned on. FIG. 5 shows the light emission pattern in a case where the front end section 51 of the pointing element 50 is not in contact with the screen SS and the front end switch 54 has therefore been turned off.

For example, assume that the pointing element 50 emits light in the light emission pattern set at "100." In the case where the front end switch 54 has been turned on, the pointing element 50 emits light in the third phase PH3 of the first cycle and emits no light in the third phase PH3 of the second and third cycles, as shown in FIG. 4. In the case where the front end switch 54 has been turned off, the pointing element 50 emits no light in the third phase PH3 of the first cycle and emits light in the third phase PH3 of the second cycle, as shown in FIG. 5. The pointing element 50 emits light in the third phase PH3 of the third cycle.

The projector 100 can detect whether the front end switch 54 of the pointing element 50 has been turned on or off by detecting the light emission state in the third phase PH3.

The fourth phase PH4 is the position detection phase, as is the second phase PH2. The pointing element 50 transmits the pointing element signal light PSL in the fourth phase PH4, as in the second phase PH2. The projector 100 causes the imaging section 150 to perform the image capture in accordance with the light emission timing at which the pointing element 50 emits light in the fourth phase PH4 to capture an image of the pointing element signal light PSL.

The light emission mode of the pointing element 50 described with reference to FIGS. 3 to 5 is called a first light emission mode. In detail, the first light emission mode is a light emission mode in which the pointing element 50 emits light with no decrease in the amount of emitted light. The first light emission mode is a light emission mode of the front end light emitter 55 in the case where the front end section 51 of the pointing element 50 is not in contact with the screen SS, which is the operation surface, and the front end switch 54 has therefore been turned off.

The pointing element 50 also has a second light emission mode as well as the first light emission mode. The second light emission mode is a light emission mode in which the amount of light emitted from the front end light emitter 55 is smaller than in the first light emission mode. The second light emission mode is a light emission mode of the front end light emitter 55 in the case where the front end section 51 of the pointing element 50 has come into contact with the screen SS, which is the operation surface, and the front end switch 54 has therefore been turned on.

Figure 6:
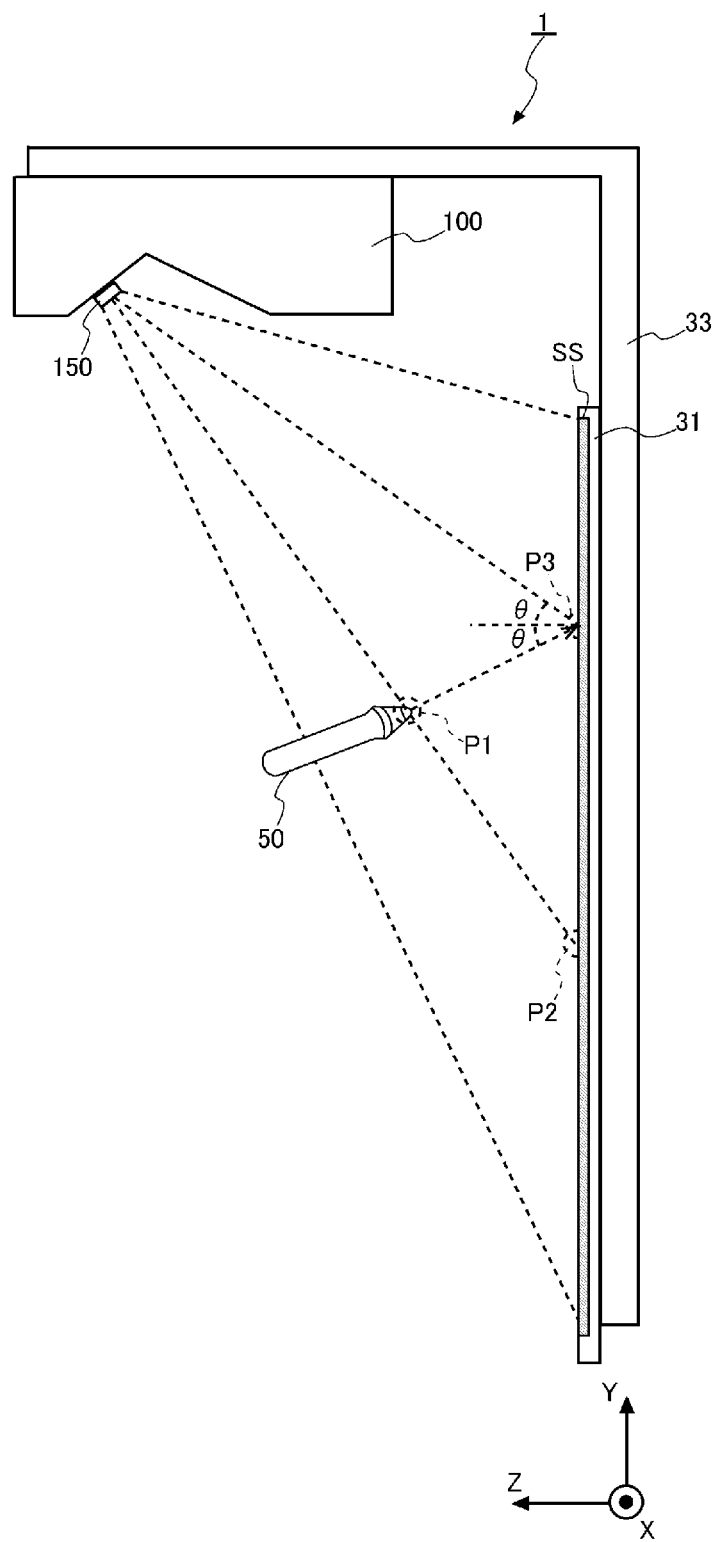
FIG. 6 is a side view of the position detection system.
Figure 7:
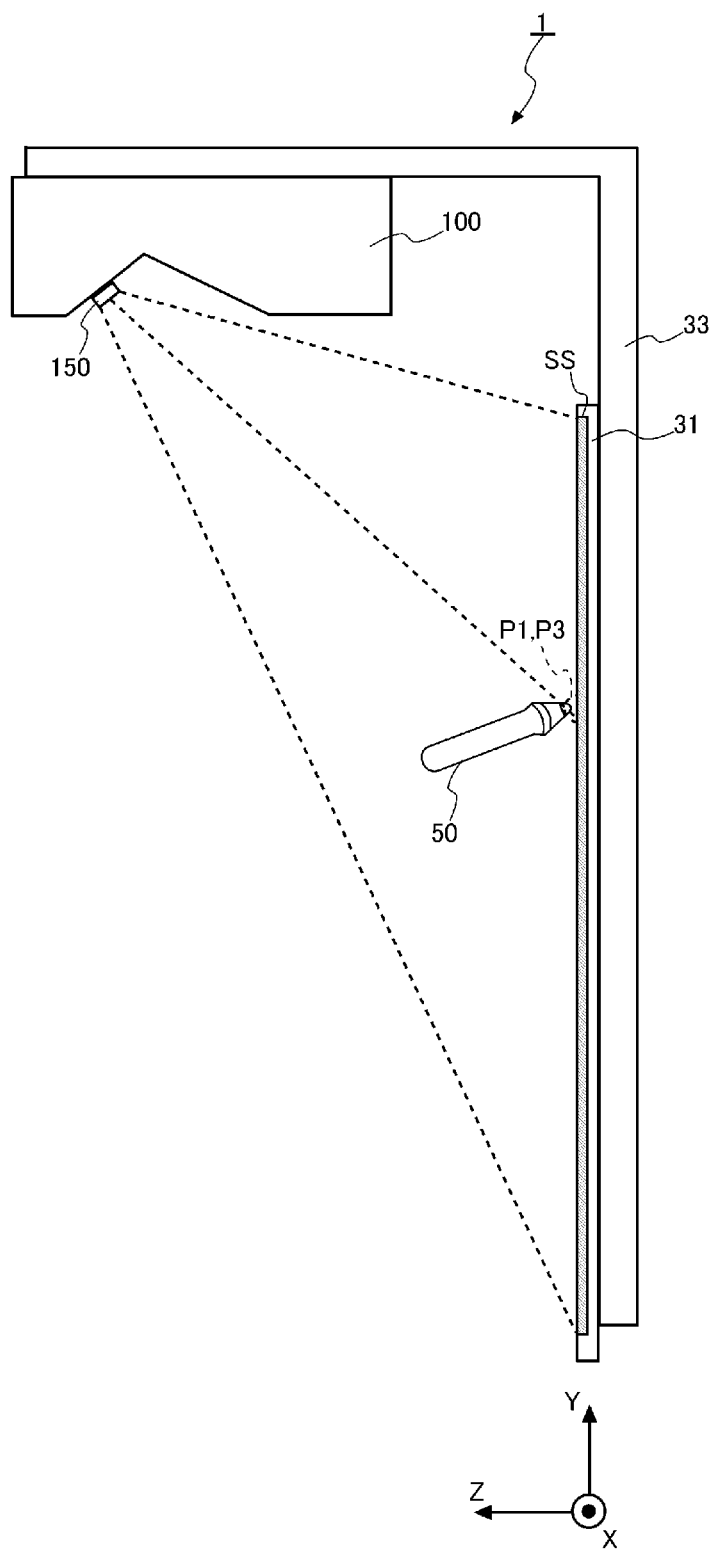
FIG. 7 is another side view of the position detection system.

The second light emission mode will next be described. First, the reason why the amount of light emitted from the front end light emitter 55 can be reduced in the second light emission mode will be described with reference to FIGS. 6 and 7. FIGS. 6 and 7 are side views of the position detection system 1. In FIGS. 6 and 7, the directions are defined as follows: The rightward/leftward direction of the screen SS is an X-axis direction; the upward/downward direction of the screen SS is a Y-axis direction; and the direction of a normal to the screen SS is a Z-axis direction. FIG. 6 shows a case where the pointing element 50 is separate from the screen SS, and FIG. 7 shows a case where the pointing element 50 is in contact with the screen SS.

The projector 100 is fixed via the support member 33 in a position in front of the screen plate 31 and thereabove, as shown in FIGS. 6 and 7. The imaging section 150 is therefore also located in a position in front of the screen plate 31 and thereabove and captures an image of the screen SS from a position separate from the screen SS obliquely upward. Therefore, to detect the light emitted from the pointing element 50 based on captured image data from the imaging section 150, the front end light emitter 55 is configured to emit light having at least a fixed amount.

The distance between the imaging section 150 and the screen SS is greater than the distance of the pointing element 50 held by the user with a hand and the screen SS, as shown in FIG. 6. The imaging section 150 therefore performs the image capture in a position obliquely above and behind the pointing element 50. In the arrangement described above, and in a case where the imaging section 150 captures an image of the pointing element 50 that emits light in a position P1 shown in FIG. 6, the pointing element 50 detected from the captured image data is located in a position P2 on the screen SS. On the other hand, the position where the light emitted from the front end light emitter 55 is reflected off the screen SS is a position P3. FIG. 6 shows a case where the angle of incidence θ at which the light is incident on the screen SS is equal to the angle of reflection θ at which the light is reflected off the screen SS. In the case where the pointing element 50 is separate from the screen SS as described above, the position P2 of the pointing element 50 detected from the captured image data differs from the position P3, where the light emitted from the front end light emitter 55 is reflected off the screen SS.

In the case where the pointing element 50 is in contact with the screen SS, as shown in FIG. 7, the position P1 of the front end light emitter 55 coincides with the position P3, where the light emitted from the front end light emitter 55 is reflected off the screen SS. That is, the captured image data captured by the imaging section 150 contains an image of the light emitted from the front end light emitter 55 and an image of the reflected light that is the emitted light reflected off the screen SS with the emitted light and the reflected light located in the same position. Therefore, assuming that the front end light emitter 55 emits light having the same amount both in the case where the pointing element 50 is in contact with the screen SS and the case where the pointing element 50 is separate from the screen SS, the captured image data contains a brighter image of the pointing element 50 in the case where the pointing element 50 is in contact with the screen SS than in the other case.

Therefore, in the present embodiment, the amount (brightness) of light emitted from the front end light emitter 55 in the case where the pointing element 50 is in contact with the screen SS is set to be smaller than the amount (brightness) of light emitted from the front end light emitter 55 in the case where the pointing element 50 is not in contact with the screen SS. In the case where the pointing element 50 is in contact with the screen SS, reduction in the amount of light emitted from the front end light emitter 55 still allows the direct light and the reflected light to be captured in the same position, whereby the projector 100 can identify the position of the pointing element 50 from the captured image data. That is, in the case where the pointing element 50 is in contact with the screen SS, the power consumption of the pointing element 50 can be reduced with no decrease in accuracy of detection of the pointing element 50 performed by the imaging section 150.

Figure 8:
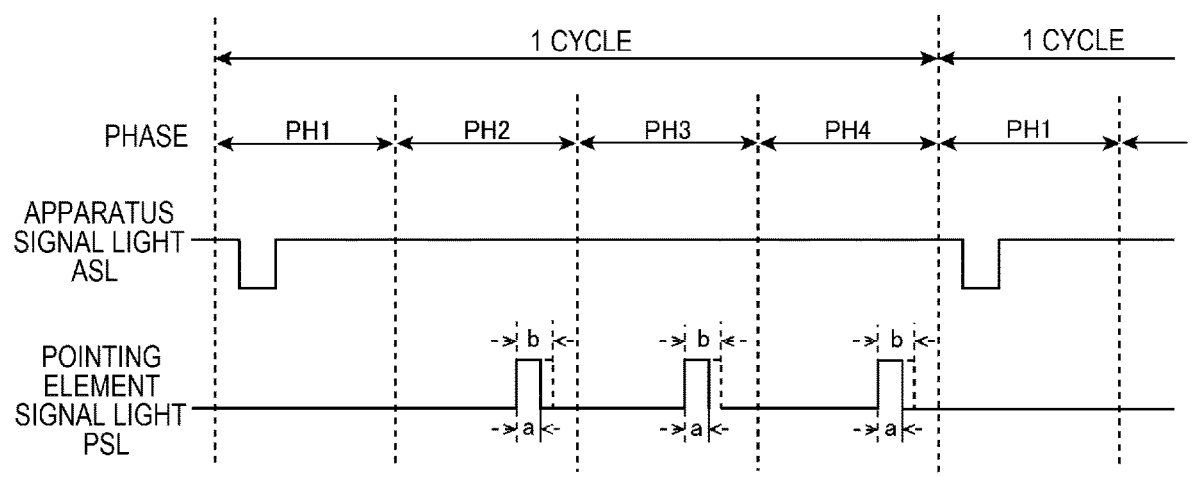
FIG. 8 shows a light emission sequence in accordance with which the projector and the pointing element emit light in a second light emission mode.

FIG. 8 shows a light emission sequence in accordance with which the pointing element 50 emits light in the case where the pointing element 50 operates in the second light emission mode.

In the present embodiment, in which the amount of light emitted from the front end light emitter 55 of the pointing element 50 is reduced in the second light emission mode, the light emission time period for which the front end light emitter 55 emits light in each of the first phase PH1 to the fourth phase PH4 is so set as to be shorter than the light emission time period for which the front end light emitter 55 emits light in the first light emission mode.

In FIG. 8, "a" represents the light emission time period of the pointing element signal light PSL in the case where the pointing element 50 operates in the second light emission mode, and "b" represents the light emission time period of the pointing element signal light PSL in the case where the pointing element 50 operates in the first light emission mode. The light emission time period "a" is shorter than the light emission time period "b". The amount of light emitted from the pointing element 50 in the second light emission mode is thus reduced. The power consumption of the pointing element 50 can be minimized by shortening the light emission time period in each of the first phase PH1 to the fourth phase PH4, or the light emission time period can be shortened in at least any of the first phase PH1 to the fourth phase PH4. Also in this case, the power consumption of the pointing element 50 can be smaller than in the first light emission mode.

As another method for reducing the amount of light emitted from the pointing element 50 in the second light emission mode, the power itself of light emitted from the front end light emitter 55 may be changed to reduce the amount of light emitted from the pointing element 50 in the second light emission mode. The configuration of the pointing element 50 in this case will be described with reference to FIG. 9.

Figure 9:
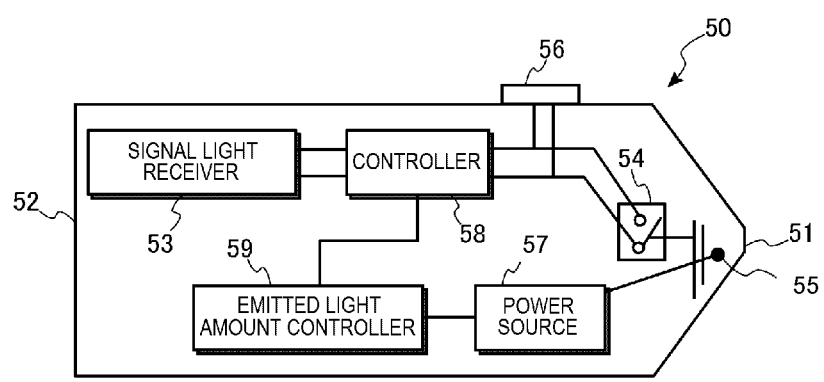
FIG. 9 is a configuration diagram showing another configuration of the pointing element.

FIG. 9 is a configuration diagram showing another configuration of the pointing element 50.

The pointing element 50 includes an emitted light amount controller 59, which corresponds to the "adjuster" in an aspect of the invention. The emitted light amount controller 59 is connected to the controller 58 and the power source 57 and adjusts the amount of current supplied from the power source 57 to the front end light emitter 55 under the control of the controller 58. The emitted light amount controller 59 sets the amount of current supplied to the front end light emitter 55 in the case where the pointing element 50 operates in the second light emission mode to be smaller than the amount of current supplied to the front end light emitter 55 in the case where the pointing element 50 operates in the first light emission mode. The amount of light emitted from the front end light emitter 55 in the second light emission mode can thus be smaller than the amount of light emitted from the front end light emitter 55 in the first light emission mode.

Procedure of Action of Pointing Element

Figure 10:
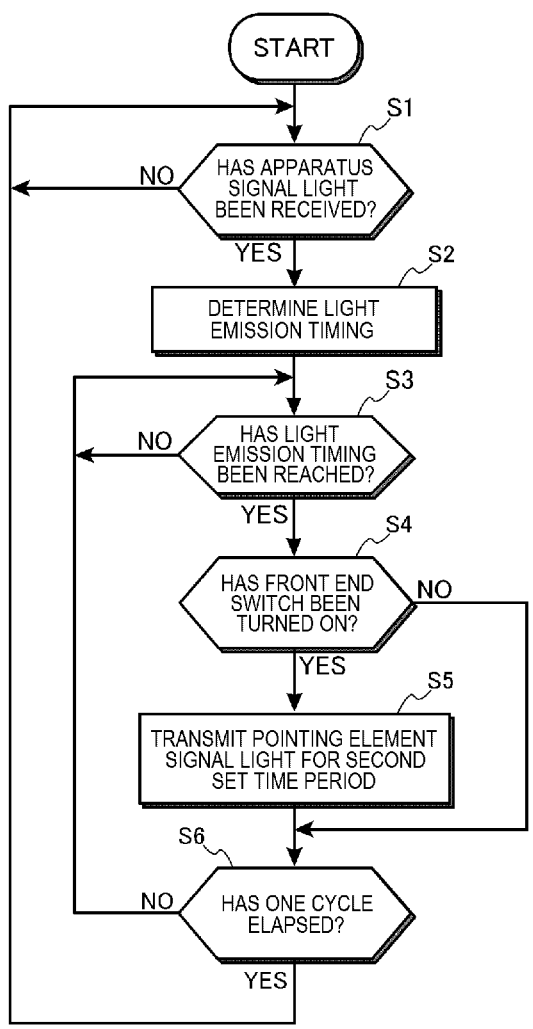
FIG. 10 is a flowchart showing the action of the pointing element.

FIG. 10 is a flowchart showing the action of the pointing element 50. The action of the controller 58 will be described with reference to the flowchart shown in FIG. 10.

The controller 58 first evaluates whether or not the apparatus signal light ASL, which is the near-infrared light signal for synchronization, has been received from the projector 100 (step S1). The controller 58 determines that the apparatus signal light ASL has been received when the control signal representing the timing at which the apparatus signal light ASL is received or data resulting from decoding of the apparatus signal light ASL is inputted from the signal light receiver 53. In a case where no apparatus signal light ASL has been received (NO in step S1), the controller 58 waits until the apparatus signal light ASL is received from the projector 100 (step S1).

In a case where the apparatus signal light ASL has been received (YES in step S1), the controller 58 determines the light emission timing at which the front end light emitter 55 emits light in the second phase PH2, the third phase PH3, and the fourth phase PH4 based on the control signal inputted from the signal light receiver 53 (step S2). The flowchart will be described on the assumption that the button switch 56 is not pressed so that the pointing element 50 emits no light in the first phase PH1.

The controller 58 then evaluates whether or not the determined light emission timing has been reached (step S3). In a case where the light emission timing has not been reached (NO in step S3), the controller 58 waits until the light emission timing is reached. In a case where the light emission timing has been reached (YES in step S3), the controller 58 evaluates whether or not the front end switch 54 has been turned on (step S4).

In a case where the front end switch 54 has not been turned on (NO in step S4), the controller 58 causes the pointing element 50 to operate in the first light emission mode. The pointing element 50 caused to operate in the first light emission mode emits light for a first set time period in each of the first phase PH1 to the fourth phase PH4. The controller 58 evaluates, when the light emission from the front end light emitter 55 in the current phase (any of first phase PH1 to fourth phase PH4) ends, whether or not one cycle has elapsed (step S6). In a case where one cycle has elapsed (YES in step S6), the controller 58 returns to step S1. In a case where one cycle has not elapsed (NO in step S6), the controller 58 returns to step S3, where the controller 58 evaluates whether or not the light emission timing has been reached (step S3).

In a case where the front end switch 54 has been turned on (YES in step S4), the controller 58 causes the front end light emitter 55 to emit light for a second set time period to transmit the pointing element signal light PSL (step S5). The second set time period is set to be shorter than the first set time period. That is, in the case where the front end switch 54 has been turned on and the front end section 51 of the pointing element 50 is therefore in contact with the screen SS, the light emission time period for which the front end light emitter 55 emits light is set to be shorter than the light emission time period in the case where the front end section 51 is not in contact with the screen SS. The power consumption of the pointing element 50 can thus be reduced.

The controller 58 then evaluates whether or not one cycle has elapsed (step S6). In the case where one cycle has not elapsed (NO in step S6), the controller 58 returns to step S3, where the controller 58 waits until the following light emission timing is reached. In the case where one cycle has elapsed (YES in step S6), the controller 58 returns to step S1 and receives the apparatus signal light ASL from the projector 100 (step S1).

In the embodiment described above, in the case where the front end switch 54 has been turned off, the pointing element 50 is caused to emit light in the first light emission mode, whereas in the case where the front end switch 54 has been turned on, the pointing element 50 is caused to emit light in the second light emission mode. As another example, the pointing element 50 may be provided with a distance sensor, and the pointing element 50 may be caused to emit light in the first or second light emission mode based on the distance to the screen SS detected with the distance sensor.

For example, in a case where the distance to the screen SS is smaller than or equal to a preset distance, the controller 58 causes the pointing element 50 to emit light in the second light emission mode. For example, setting the preset distance at 1 mm allows operation on the screen SS in a state in which the pointing element 50 is not in contact with the screen SS but hovers above (separate from) the screen SS.

When the amount of light emitted from the pointing element 50 is reduced in the second light emission mode, the reduced amount of light may be changed based on the optical characteristics of the screen SS. In detail, the direction in which the light emitted from the pointing element 50 is reflected off the screen SS changes in accordance with the optical characteristics thereof. Therefore, in the case of a screen SS optically characterized in that the screen SS reflects the light emitted from the pointing element 50 by a greater amount in the direction toward the imaging section 150 than in the other directions to allow the imaging section 150 to capture an image of the reflected light, the pointing position can be detected from captured image data with the amount of light emitted from the pointing element 50 further reduced. To this end, the user inputs information representing the optical characteristics of the screen SS, and the controller 58 changes the amount of light emitted from the front end light emitter 55 based on the inputted information.

For example, the pointing element 50 is provided with an operation section, and the user inputs information representing the optical characteristics of the screen SS via the operation section. The user may instead input information representing the optical characteristics of the screen SS via the operation section of the projector 100. The projector 100 transmits the information representing the optical characteristics of the screen SS accepted via the operation section to the pointing element 50 in the form of a near-infrared light signal. The timing at which the projector 100 transmits the information representing the optical characteristics can, for example, be a timing before the light emission sequence shown in FIG. 9 starts.

Examples of the optical characteristics of the screen SS may include diffusive, regressive, and reflective optical characteristics. The diffusive optical characteristics cause the light having impinged on the screen SS to be diffusively reflected over 360° uniformly with no unevenness. The regressive optical characteristics cause the light reflected off the screen SS to travel back in the direction in which the light is incident on the screen SS. The reflective optical characteristics cause the light incident on the screen SS to be reflected in the direction opposite the direction in which the incident light travels with respect to a normal to the screen SS, that is, in such away that the angle of incidence and the angle of reflection are equal to each other.

The pointing element 50 changes the amount of reduction in the amount of light emitted from the pointing element 50 in accordance with the inputted optical characteristics of the screen SS.

As described above, the pointing element 50 according to the present embodiment is an operation device used to operate the screen SS, which is an operation surface, and includes the front end light emitter 55, which acts as the light emitter, and the controller 58, which causes the front end light emitter 55 to emit light for signal light transmission.

The controller 58 causes the front end light emitter 55 to emit light in the first light emission mode in the state in which the front end section 51 is not in contact with the screen SS and causes the front end light emitter 55 to emit light in the second light emission mode, in which the amount of light emitted from the front end light emitter 55 is smaller than in the first light emission mode, in the state in which the front end section 51 is in contact with the screen SS.

The power consumption of the pointing element 50 can therefore be reduced with a decrease in operation detection accuracy suppressed.

The controller 58 causes the front end light emitter 55 to periodically emit light in the first or second light emission mode. The first and second light emission modes each have the first phase PH1 to the fourth phase PH4, which are a plurality of light emission time periods, in one period. The light emission time period in each of the phases in the case where the front end light emitter 55 is caused to emit light in the second light emission mode is shorter than the light emission time period in each of the phases in the case where the front end light emitter 55 is caused to emit light in the first light emission mode.

The power consumption in the case where the pointing element 50 is caused to emit light in the second light emission mode can therefore be reduced.

The pointing element 50 includes the emitted light amount controller 59, which adjusts the current supplied to the front end light emitter 55. The controller 58 controls the emitted light amount controller 59 in such a way that the amount of current supplied to the front end light emitter 55 in the second light emission mode is smaller than the amount of current supplied to the front end light emitter 55 in the first light emission mode.

The power consumption in the case where the pointing element 50 is caused to emit light in the second light emission mode can therefore be reduced.

The controller 58 changes the amount of light emitted from the front end light emitter 55 in the second light emission mode based on the optical characteristics of the screen SS.

The amount of light emitted from the front end light emitter 55 can therefore be changed to an optimum amount of light based on the optical characteristics of the screen, whereby the power consumption of the operation device can be further reduced.

The pointing element 50 further includes the front end switch 54, which detects contact with the screen SS. The controller 58 causes the front end light emitter 55 to emit light in the first light emission mode in the state in which the front end switch 54 has not detected contact with the screen SS. The controller 58 causes the front end light emitter 55 to emit light in the second light emission mode in the state in which the front end switch 54 has detected contact with the screen SS.

The front end light emitter 55 is therefore allowed to emit light in the first or second light emission mode based on whether or not the front end switch 54 has detected the contact with the screen SS.

The embodiment described above is a preferable form in which the invention is implemented. The invention is, however, not limited to the embodiment described above, and a variety of changes can be made thereto to the extent that the changes do not depart from the substance of the invention.

For example, the above embodiment has been described with reference to the case where the projector 100 is a liquid crystal projector using a transmissive liquid crystal panel. The projector 100 may instead be a projector using a reflective liquid crystal panel or a digital mirror device.

The functional portions of the pointing element 50 shown in FIG. 2 each represent a functional configuration achieved by cooperation of hardware and software and are not each necessarily implemented in a specific form. Therefore, hardware corresponding to each of the functional portions is not necessarily implemented, and a single processor that executes a program can, of course, achieve the functions of the plurality of functional portions. Further, part of the functions achieved by software in the embodiment described above may be achieved by hardware, and part of the functions achieved by hardware may be achieved by software.

For example, in the configuration of the pointing element 50 shown in FIG. 2, the signal light receiver 53, the front end switch 54, the front end light emitter 55, and the power source 57 may each be formed of hardware. At least part of the signal light receiver 53, the controller 58, the power source 57, and the front end switch 54 may be formed of an integrated circuit (IC) or any other digital circuit, and at least part of each of the sections described above may include an analog circuit. The integrated circuit includes an LSI, an application specific integrated circuit (ASIC), and a PLD. The PLD includes, for example, an FPGA. The sections described above may each be the combination of a processor and an integrated circuit. The combination is called, for example, a microcontroller (MCU), an SoC (system-on-a-chip), a system LSI, and a chip set.

In the configuration of the projector 100 shown in FIG. 2, the projection image generation section 120, the signal light transmission section 140, and the position detection section 160 may each be formed of hardware. At least part of the projection image generation section 120, the signal light transmission section 140, the position detection section 160, and the control section 110 may be formed of an integrated circuit (IC) or any other digital circuit. At least part of each of the sections described above may include an analog circuit. The sections described above may each be formed of the combination of a processor and an integrated circuit.

Further, in the case where the method for controlling the operation device described above is achieved by using a computer provided in the operation device, the invention may be configured in the form of a program executed by the computer to achieve the control method described above, a recording medium on which the program is so recorded as to be readable by the computer, or a transmission medium that transmits the program. The recording medium described above can be a magnetic recording medium, an optical recording medium, or a semiconductor memory device.

The process units in the flowchart shown in FIG. 10 are process units divided in accordance with the contents of the primary processes for easy understanding of the processes carried out by the controller 58 of the pointing element 50. How to produce the divided process units or the names thereof shown in the flowchart shown in FIG. 10 do not limit the embodiment of the invention. The processes carried out by the controller 58 can each be further divided into a larger number of process units in accordance with the content of the process, and each of the process units can further be divided into a large number of processes. Further, the order in which the processes are carried out in the flowchart described above is not limited to the order shown in FIG. 10.

The entire disclosure of Japanese Patent Application No. 2018-065181, filed Mar. 29, 2018 is expressly incorporated by reference herein.

What is claimed is:

1. An operation device used to operate an operation surface, the operation device comprising:
   a light emitter; and
   a controller that causes the light emitter to emit light for signal light transmission,
   wherein the controller
   causes the light emitter to emit light in a first light emission mode in a state in which the operation device is not in contact with the operation surface, and
   causes the light emitter to emit light in a second light emission mode in which an amount of light emitted from the light emitter is smaller than in the first light emission mode in a state in which the operation device is in contact with the operation surface.

2. The operation device according to claim 1,
   wherein the controller causes the light emitter to periodically emit light in the first or second light emission mode,
   the first and second light emission modes each have a plurality of light emission time periods in one period, and
   a light emission time period in the second light emission mode is shorter than the light emission time period in the first light emission mode.

3. The operation device according to claim 1, further comprising
   an adjuster that adjusts current supplied to the light emitter,
   wherein the controller controls the adjuster in such a way that an amount of current supplied to the light emitter in the second light emission mode is smaller than the amount of current supplied to the light emitter in the first light emission mode.

4. The operation device according to claim 1,
   wherein the controller changes the amount of light emitted from the light emitter in the second light emission mode based on optical characteristics of a screen as the operation surface.

5. The operation device according to claim 1, further comprising
   a detector that detects the contact with the operation surface,
   wherein the controller causes the light emitter to emit light in the first light emission mode in a state in which the detector has not detected the contact with the operation surface and causes the light emitter to emit light in the second light emission mode in a state in which the detector has detected the contact with the operation surface.

6. A position detection system comprising:
   an operation device used to operate an operation surface; and
   a detection apparatus that detects operation performed by using the operation device,
   wherein the operation device includes
   a light emitter, and
   a controller that causes the light emitter to emit light for signal light transmission,
   the controller
   causes the light emitter to emit light in a first light emission mode in a state in which the operation device is not in contact with the operation surface, and
   causes the light emitter to emit light in a second light emission mode in which an amount of light emitted from the light emitter is smaller than in the first light emission mode in a state in which the operation device is in contact with the operation surface,
   the detection apparatus includes
   an optical detector that detects light emitted from the operation device, and
   a detection controller that detects operation performed by using the operation device on the operation surface based on a state of the detection performed by the optical detector.

7. The position detection system according to claim 6,
   wherein the operation device
   causes the light emitter to periodically emit light in the first or second light emission mode,
   the first and second light emission modes each have a plurality of light emission time periods in one period, and
   a light emission time period in the second light emission mode is shorter than the light emission time period in the first light emission mode.

8. The position detection system according to claim 6,
   wherein the operation device
   includes an adjuster that adjusts current supplied to the light emitter, and controls the adjuster in such a way that an amount of current supplied to the light emitter in the second light emission mode is smaller than the amount of current supplied to the light emitter in the first light emission mode.

9. The position detection system according to claim 6, wherein the operation device changes the amount of light emitted from the light emitter in the second light emission mode based on optical characteristics of a screen as the operation surface.

10. The position detection system according to claim 6, wherein the operation device includes
a detector that detects the contact with the operation surface, and
causes the light emitter to emit light in the first light emission mode in a state in which the detector has not detected the contact with the operation surface and causes the light emitter to emit light in the second light emission mode in a state in which the detector has detected the contact with the operation surface.

11. A method for controlling an operation device including a light emitter and used to operate an operation surface, the method comprising:
detecting whether or not the operation device is in contact with the operation surface;
causing the light emitter to emit light in a first light emission mode in a case where the state in which the operation device is not in contact with the operation surface is detected; and
causing the light emitter to emit light in a second light emission mode in which an amount of light emitted from the light emitter is smaller than in the first light emission mode in a case where the state in which the operation device is in contact with the operation surface is detected.

12. The method for controlling an operation device according to claim 11, further comprising
causing the light emitter to periodically emit light in the first or second light emission mode,
wherein the first and second light emission modes each have a plurality of light emission time periods in one period, and
a light emission time period in the second light emission mode is shorter than the light emission time period in the first light emission mode.

13. The method for controlling an operation device according to claim 11, further comprising
setting an amount of current supplied to the light emitter in the second light emission mode to be smaller than the amount of current supplied to the light emitter in the first light emission mode.

14. The method for controlling an operation device according to claim 11, further comprising
changing the amount of light emitted from the light emitter in the second light emission mode based on optical characteristics of a screen as the operation surface.

15. The method for controlling an operation device according to claim 11,
wherein the operation device further includes a detector that detects the contact with the operation surface, and
the method further comprising causing the light emitter to emit light in the first light emission mode in a state in which the detector has not detected the contact with the operation surface and causes the light emitter to emit light in the second light emission mode in a state in which the detector has detected the contact with the operation surface.

\* \* \* \* \*